United States Patent
Kelly

(10) Patent No.: US 9,117,141 B2
(45) Date of Patent: Aug. 25, 2015

(54) METHOD AND APPARATUS FOR IDENTIFYING REGIONS OF INTEREST IN MEDICAL IMAGING DATA

(71) Applicant: Matthew David Kelly, Botley (GB)

(72) Inventor: Matthew David Kelly, Botley (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 384 days.

(21) Appl. No.: 13/650,240

(22) Filed: Oct. 12, 2012

(65) Prior Publication Data

US 2013/0094737 A1    Apr. 18, 2013

(30) Foreign Application Priority Data

Oct. 14, 2011   (GB) .................................. 1117807.6

(51) Int. Cl.
| | | |
|---|---|---|
| G06K 9/00 | (2006.01) | |
| G06K 9/62 | (2006.01) | |
| G06K 9/32 | (2006.01) | |
| G06K 9/46 | (2006.01) | |
| G06T 7/00 | (2006.01) | |
| G06T 15/08 | (2011.01) | |

(52) U.S. Cl.
CPC ................ G06K 9/62 (2013.01); G06K 9/3233 (2013.01); G06K 9/4647 (2013.01); G06T 7/0012 (2013.01); G06T 15/08 (2013.01); *G06T 2207/10104* (2013.01); *G06T 2207/10108* (2013.01); *G06T 2207/20068* (2013.01); *G06T 2207/30096* (2013.01)

(58) Field of Classification Search
CPC ................... G06T 2207/30096; G06T 7/0012
See application file for complete search history.

(56) References Cited

U.S. PATENT DOCUMENTS

| | | | | |
|---|---|---|---|---|
| 5,368,033 | A * | 11/1994 | Moshfeghi | 600/419 |
| 5,570,404 | A * | 10/1996 | Liang et al. | 378/8 |
| 6,639,211 | B1 * | 10/2003 | Anand et al. | 250/282 |
| 6,697,067 | B1 * | 2/2004 | Callahan et al. | 345/427 |
| 7,088,848 | B2 * | 8/2006 | Faber | 382/128 |
| 7,218,765 | B2 * | 5/2007 | Knoplioch et al. | 382/131 |
| 7,250,949 | B2 * | 7/2007 | Claus et al. | 345/424 |
| 7,339,585 | B2 * | 3/2008 | Verstraelen et al. | 345/424 |
| 7,355,598 | B2 | 4/2008 | Yang et al. | |
| 7,356,178 | B2 * | 4/2008 | Ziel et al. | 382/154 |
| 7,369,691 | B2 | 5/2008 | Kondo et al. | |
| 2004/0077942 | A1 * | 4/2004 | Hall et al. | 600/428 |
| 2004/0096088 | A1 * | 5/2004 | Kohle | 382/128 |
| 2005/0215889 | A1 * | 9/2005 | Patterson, II | 600/436 |

(Continued)

FOREIGN PATENT DOCUMENTS

| | | |
|---|---|---|
| GB | 2472273 | 12/2010 |
| JP | 2007054504 | 3/2007 |
| JP | 2009279179 A | 12/2009 |

OTHER PUBLICATIONS

Tsujita, Takeyoshi, "Ultrasonographic Apparatus" (English Translation), Mar. 8, 2007, JP-2007054504, p. 1-10.*

*Primary Examiner* — Gandhi Thirugnanam
(74) *Attorney, Agent, or Firm* — Schiff Hardin LLP

(57) ABSTRACT

In a method and apparatus for identifying a region of interest in medical imaging data of a subject is described, an intensity projection image is generated from the medical imaging data. The medical imaging data is then processed to find one or more maxima in the medical imaging data. The found maxima are compared with the intensity projection image, and one of the maxima which is not represented in the intensity projection image is identified.

10 Claims, 3 Drawing Sheets

(56) References Cited

U.S. PATENT DOCUMENTS

| | | |
|---|---|---|
| 2007/0003118 A1 | 1/2007 | Wheeler et al. |
| 2007/0201737 A1* | 8/2007 | Cai .............................. 382/131 |
| 2010/0316272 A1* | 12/2010 | Kadir et al. .................. 382/128 |
| 2011/0235885 A1 | 9/2011 | Rauch et al. |
| 2012/0170820 A1 | 7/2012 | Declerck et al. |
| 2012/0177258 A1* | 7/2012 | Hakl et al. ................... 382/128 |
| 2012/0329085 A1* | 12/2012 | Chang et al. .................... 435/29 |
| 2013/0094727 A1* | 4/2013 | Kelly ............................ 382/128 |
| 2013/0094737 A1* | 4/2013 | Kelly ............................ 382/131 |
| 2013/0101197 A1* | 4/2013 | Kaftan et al. ................ 382/131 |
| 2014/0210821 A1* | 7/2014 | Kapoor et al. ............... 345/424 |
| 2014/0233822 A1* | 8/2014 | Kaftan et al. ................ 382/131 |
| 2014/0341452 A1* | 11/2014 | Kaftan et al. ................ 382/130 |

\* cited by examiner

Hidden hotspot — 410

METHOD AND APPARATUS FOR IDENTIFYING REGIONS OF INTEREST IN MEDICAL IMAGING DATA

BACKGROUND OF THE INVENTION

1. Field of the Invention

This invention is directed to methods and apparatus for identifying regions of interest in medical imaging data, particularly in imaging data represented in an intensity projection image, such as an MIP (Maximum Intensity Projection).

2. Description of the Prior Art

In the medical imaging field, several imaging schemes are known. For example PET (Positron Emission Tomography) is a method for imaging a subject in 3D using an injected radioactive substance which is processed in the body, typically resulting in an image indicating one or more biological functions. Other such functional imaging modalities are known, such as SPECT.

In such functional images, many important pathologies and anatomical structures appear as very high (or low) intensities. For example, a tumor in an FDG-PET image will often appear as a bright region or "hotspot".

A Maximum Intensity Projection (MIP) image is a useful way to visualize such medical images. Each pixel in a MIP is the maximal intensity along a ray orthogonal to the plane of the MIP. The resulting pixel values come from different depths along the rays and hence a MIP can be thought of as a simple form of 3D visualization.

In oncology, the rotating maximum intensity projection (MIP) is typically the first image reviewed by a PET reading physician to provide a quick overview of the case. The MIP allows rapid localization of potential lesions and can be used to navigate to regions of interest in the multi planar reconstruction views.

Due to the nature of the MIP, a hotspot will only be visualized if it contains the highest voxel value along one of the lines of projection (rays) used to generate the MIP (FIG. 1). Furthermore, it will only be identifiable on the MIP if it is also a hotspot (or local maximum) on at least one of the 2D MIP images.

In the example shown in FIG. 1, an axial image slice 100 from medical image data of a subject, the hotspot 102 would not be visualized on any of the MIP angles 106 if the uptake in the liver 104 was higher than that in the hotspot. This is because each of the rays to construct the 2D MIP at any of the angles (106) contains a higher maximum voxel (in the liver) than the hotspot. It is therefore possible that clear hotpots in the image volume will not be visualized on the MIP.

Typically in current clinical reads, the MIP is generally used to give an initial overview of the case, but relies on a detailed review of the MPRs to fully read the case, as providing the MPR read is thoroughly, any MIP-hidden hotspots could still be read on the MPR. This of course requires further steps, time and costs.

In addition, although MIP-hidden hotspots may be visible in the MPRs, any MIP-based features for interacting with the MPRs will not be available; for example, clicking on the hotspot in the MIP to center the crosshairs in the MPR, or clicking on the hotspot in the MIP to segment it.

SUMMARY OF THE INVENTION

An object of the present invention is to address the above-discussed problems and to provide improvements over the known devices and methods.

In general terms, one embodiment of a first aspect of the invention provides a method of identifying a region of interest in medical imaging data of a subject, including the steps of: generating an intensity projection image from the medical imaging data; processing the medical imaging data to find one or more maxima in the medical imaging data; comparing the found one or more maxima with the intensity projection image; and identifying one of the maxima which is not represented in the intensity projection image.

This provides a simple and automatable way to identify any hotspots which are present in the medical imaging data, but nevertheless "hidden" in an intensity projection image.

Preferably, the step of processing comprises defining a criterion establishing a minimum below which maxima are not considered.

Suitably, the criterion is one of: a minimum intensity threshold; a minimum volume of region containing the maximum; a minimum local intensity gradient; and a minimum intensity to background ratio.

In an embodiment, wherein the criterion is a minimum intensity threshold, the method comprises selecting all maxima in the medical imaging data exceeding the threshold.

Preferably, maxima are identified as being contained in regions of the medical imaging data exceeding the minimum criterion, the maximum of the region being the voxel containing the highest intensity value for the region.

Suitably, the intensity projection image is a maximum intensity projection image.

In one embodiment, the steps of generating, comparing and identifying comprise: generating each projection angle for the maximum intensity projection image; and identifying maxima from the processed imaging data which do not contribute to any projection ray on any angles of the maximum intensity projection image.

Preferably, this embodiment further includes generating a list of maxima in the maximum intensity projection image, and identifying maxima from the processed imaging data which do not correspond to any of the maxima in the list.

Suitably, the step of processing to find maxima comprises a connected component algorithm.

Preferably, the method further comprises displaying the identified maximum with the intensity projection image.

One embodiment of a second aspect of the invention provides an apparatus for identifying a region of interest in medical imaging data of a subject, that includes a processor configured to generate an intensity projection image from the medical imaging data, to process the medical imaging data to find one or more maxima in the medical imaging data, to compare the found one or more maxima with the intensity projection image, and to identify one of the maxima which is not represented in the intensity projection image; and a display device in communication with the processor at which the processor causes the identified maximum with the intensity projection image to be displayed.

The present invention also encompasses a non-transitory, computer-readable data storage medium encoded with programming instructions that, when the storage medium is loaded into a professor, cause the processor to implement one or more of the embodiments of the inventive method described above.

BRIEF DESCRIPTION OF THE DRAWINGS

FIG. 3 illustrates an MIP with a hotspot hidden.

FIG. 4 illustrates an MIP with the hidden hotspot identified, according to an embodiment of the invention.

DESCRIPTION OF THE PREFERRED EMBODIMENTS

When the following terms are used herein with the accompanying definitions:

PET—Positron Emission Tomography
SUV—Standardized Uptake Value
FDG—F-18 fluorodeoxyglucose, a PET radiotracer
MIP—Maximum Intensity Projection (or Minimum Intensity Projection, usually denoted MinIP)
MRI—Magnetic Resonance Imaging
ROI/VOI—Region/volume of interest.
Segmentation—the process of labeling voxels as belonging to different classes. For example, in a medical image, each voxel may be labeled according to its tissue type.
CT—Computed Tomography
MPR—Multi-Planar Reconstruction One embodiment of the invention first identifies all hotspots above some specified intensity threshold in the image volume, then for each 2D image representing a visualized MIP angle it checks whether each hotspot is also represented as a local maxima. If so, then it is visualized on the MIP (providing there is sufficient contrast between hotspot and background at the displayed window level). If not, the hotspot location on the MIP can be computed and highlighted.

Features of other embodiments of the invention described below include:

image features of potential clinical relevance are identified as local maxima in the 3D image volume above some specified threshold or volume;

the image features of potential clinical relevance are classified as visible in the 2D maximum intensity projections if they also represent local maxima with a hotspot-to-background ratio above some minimum threshold;

the 2D slices through the 3D image volume are multi-planar reconstructions; and those 2D maximum intensity projections that do allow visualization of a user-selected image feature of potential clinical relevance can be selected for display.

Figure 1:
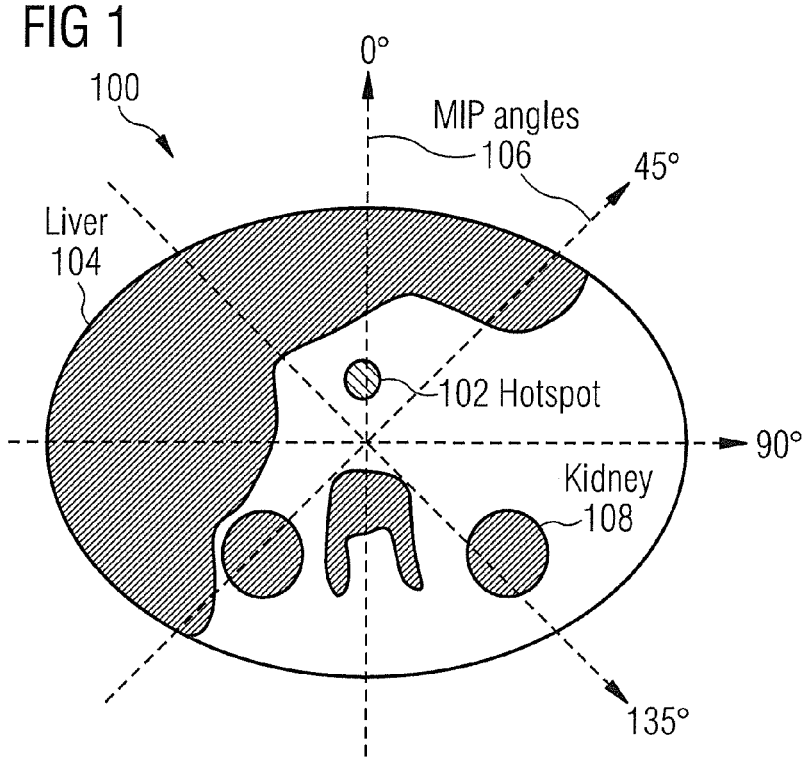
FIG. 1 is a diagram illustrating an MIP in which a hotspot is hidden.
Figure 2:
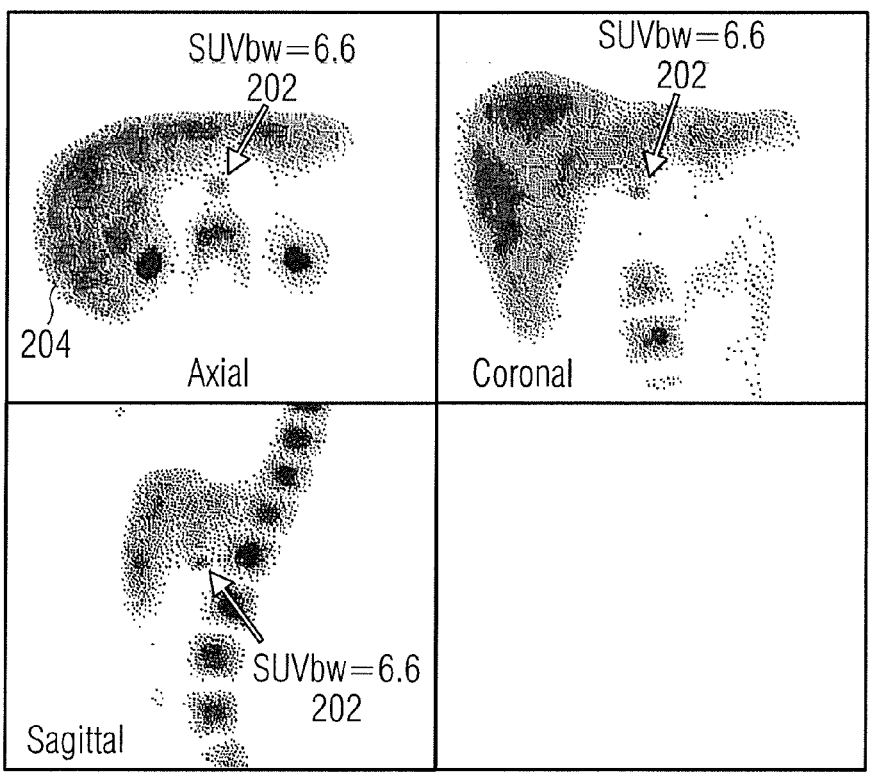
FIG. 2 shows an example of a potentially hidden hotspot, shown in an MPR view, according to an embodiment of the invention.

For illustration, consider the hotspot (202) indicated by the arrow in the 18F-FLT PET image shown in FIG. 2. FIG. 2 shows axial, coronal and sagittal MPR views of a FLT PET image of the subject. A hotspot (202), that is not visualized on the corresponding MIP of the same image volume/subject (FIG. 3), is indicated by the arrow (SUV of the hot spot is 6.6, SUV in the close-by liver (204) is about 8 on average). The hotspot 202 has an SUVmax of 6.6, but due to the location of the hotspot and the relatively high liver uptake of the tracer, this hotspot is not visualized on any angles of the rotating MIP (FIG. 3).

Figures 3, 4:
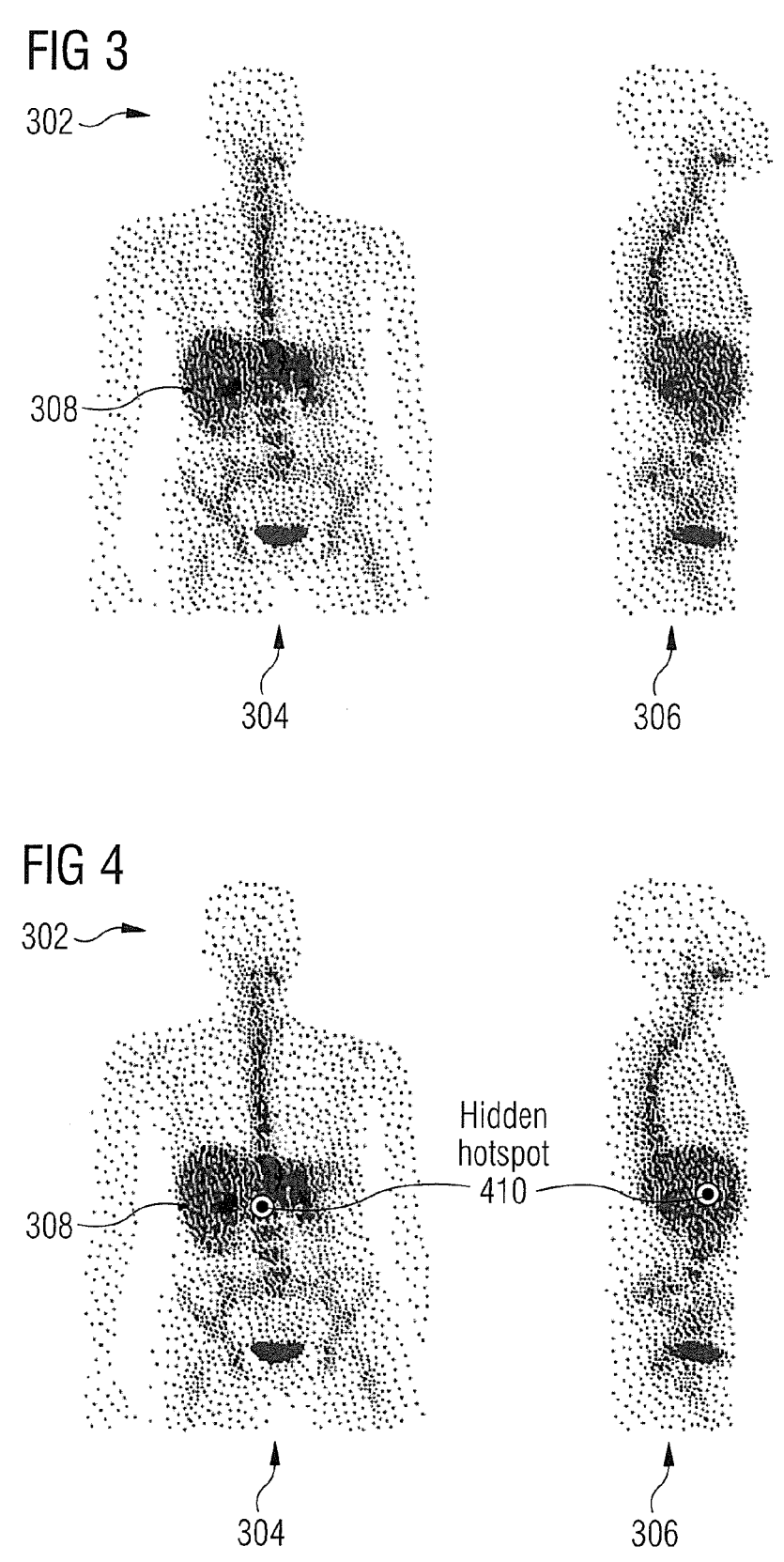

FIG. 3 shows front (304) and side (306) view MIPs of the same subject image volume (302) demonstrating the absence of this hotspot "hidden" by the liver (308). FIG. 4 shows the same front and side MIPs with the hidden hotspot (410) highlighted by a circle.

By identifying hotspots in the 3D volume that are not also visualized as local maxima in any MIP angles, the location of this hidden hotpot on the MIP can be identified and indicated to the user (e.g., with a ringed circle, such as in FIG. 4).

Figure 5:
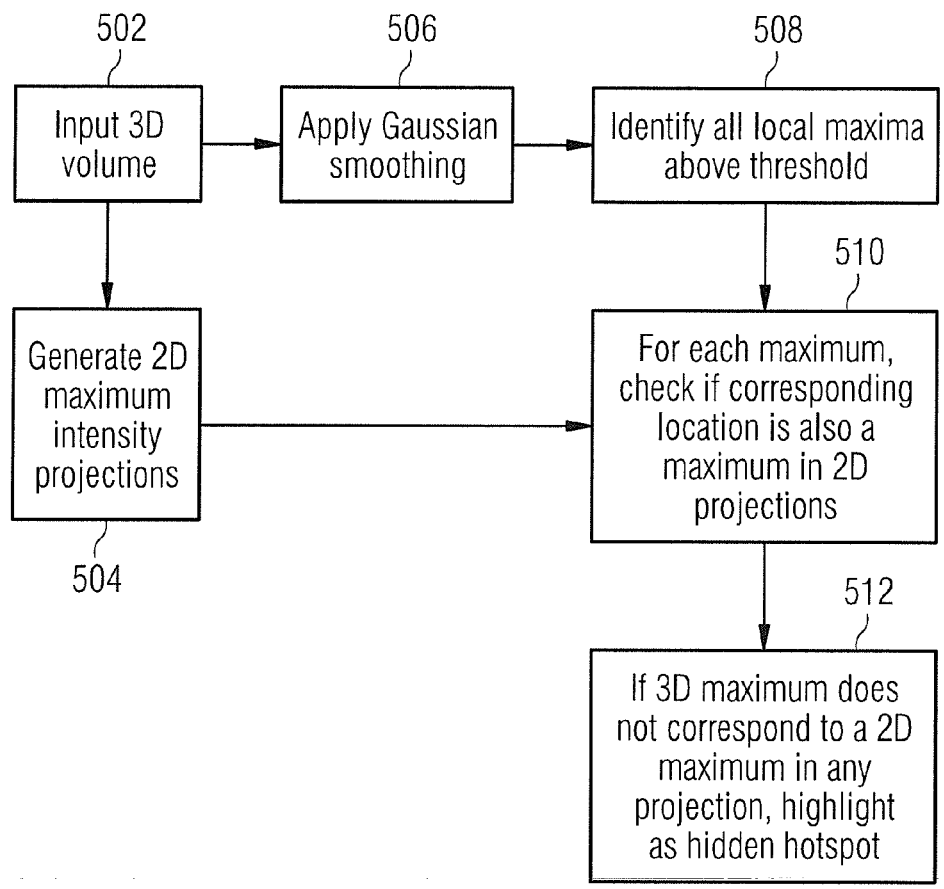
FIG. 5 illustrates steps of a method according to an embodiment of the invention.

The implementation used in one embodiment of the invention is illustrated in FIG. 5. First the 3D volume is input (502) and smoothed with a Gaussian filter (506) to reduce the number of maxima due to noise. A Matlab routine for identifying all local maxima above a given threshold (508) is then used. This threshold can be user defined or based on some analysis of the image (e.g., the PERCIST reference regions). In addition to defining a minimum intensity below which hotspots are not considered (either automatically, by the user directly, or based on other user interactions, e.g., the intensity of the finding created with the lowest intensity), other criteria can also be specified, e.g., a minimum volume or hotspot-to-background ratio.

In the next step, each projection angle for the rotating MIP is generated (504). For each projection, the rays tracing through the local maxima identified in the previous step are checked (510) to see if the voxels corresponding to the local maxima are the maximum intensities along those rays. For identified local maxima that do not contribute to any rays on any MIP angles, these are flagged as 'Missed Hotspots'. For those that do contribute, their location on the generated MIPs are recorded. Once each MIP angle is generated, the locations of those voxels corresponding to identified local maxima in the 3D image are cross-checked against a list of local maxima identified in the 2D MIPs (512). Any that do not correspond with a local maxima in at least one angle of the 2D MIPs are added to the list of 'Missed Hotspots' (since these will also not be visualized on the MIP).

If desired by the user, the locations of these 'Missed Hotspots' can then be highlighted on the MIP (e.g., using a colored overlay, or any other known method for combining further viewable information with a MIP).

Some hotspots on the MIP that do correspond to local maxima may still not be readily visualized if the local intensity gradient is very shallow compared to the intensity range of the window level. One embodiment extends the detection of local maxima in the MIP by specifying a minimal local intensity gradient, which depends on the intensity range in the window/level used for visualization, to ensure sufficient visual contrast between the hotspot and surrounding region, before classifying the hotspots as 'not-hidden'.

The above described methodology can also be used to identify those MIP angles on which a given hotspot can be visualized, by recording the angles that projected voxels from that hotspot onto a MIP image in which they also were detectable as a local maxima. This enables selection of a suitable MIP angle for visualization when the user selects a hotspot in the MPR for example.

The methodology can also record for how many MIP angles a hotspot is visualized, since those hotspots that are only visualized on 1 or 2 angles, for instance, are more likely to be missed in the MIP than those that are visualized on many more angles.

Alternative methods can be used for identifying the hotspots in the original 3D volume that will be checked for visualization in the MIP. For example, a method based on the interactive connected components (ICC) algorithm such as described in UK patent application no. GB2463141 can be used. Such a method can also be used to identify local maxima in the generated MIPs. In other embodiments, known segmentation algorithms can be used; any method which can identify regions of local maximum in the 3D image volume can be used.

Figure 6:
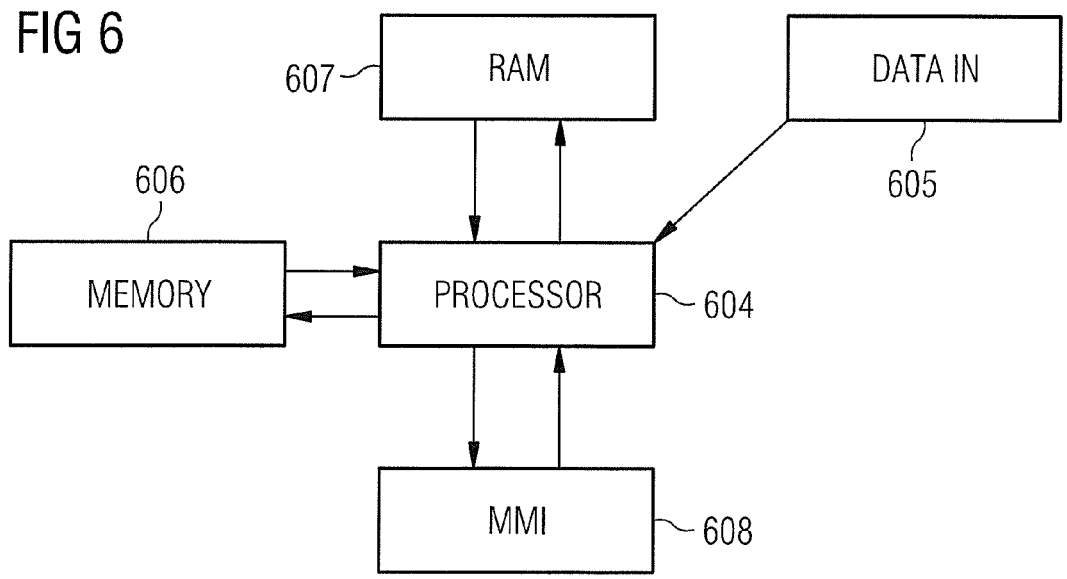
FIG. 6 illustrates an apparatus according to an embodiment of the invention.

Referring to FIG. 6, the above embodiments of the invention may be conveniently realized as a computer system suitably programmed with instructions for carrying out the steps of the methods according to the invention.

For example, a central processing unit 604 is able to receive data representative of medical scans via a port 605 which could be a reader for portable data storage media (e.g. CD-ROM); a direct link with apparatus such as a medical scanner (not shown) or a connection to a network. For example, in an embodiment, the processor performs such steps as generating an intensity projection image from the medical imaging data, processing the medical imaging data to find one or more maxima in the medical imaging data, comparing the found one or more maxima with the intensity projection image, and identifying one of the maxima which is not represented in the intensity projection image.

Software applications loaded on memory 606 are executed to process the image data in random access memory 607.

A Man—Machine interface 608 typically includes a keyboard/mouse/screen combination (which allows user input such as initiation of applications) and a screen on which the results of executing the applications are displayed.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method of identifying a region of interest in medical imaging data of a subject, comprising the steps of:
    generating a maximum intensity projection image from the medical imaging data, using projection rays at respective projection angles;
    in a processor, processing the medical imaging data to find one or more maxima in the medical imaging data by identifying maxima from the processed imaging data which do not contribute to any projection ray on any of said projection angles of the maximum intensity projection image;
    in said processor, comparing the found one or more maxima with the intensity projection image; and
    in said processor, identifying one of the maxima which is not represented in the maximum intensity projection image, and making an indication of said one of said maxima available in electronic form at an output of said processor.

2. A method according to claim 1, wherein the step of processing comprises defining a criterion establishing a minimum below which maxima are not considered.

3. A method according to claim 2, wherein the criterion is one of: a minimum intensity threshold; a minimum volume of region containing the maximum; a minimum local intensity gradient; and a minimum intensity to background ratio.

4. A method according to claim 3, wherein the criterion is a minimum intensity threshold, and the method comprises selecting all maxima in the medical imaging data exceeding the threshold.

5. A method according to claim 2, wherein maxima are identified as being contained in regions of the medical imaging data exceeding the minimum criterion, the maximum of the region being the voxel containing the highest intensity value for the region.

6. A method according to claim 1, further comprising generating a list of maxima in the maximum intensity projection image, and identifying maxima from the processed imaging data which do not correspond to any of the maxima in the list.

7. A method according to claim 1, wherein the step of processing to find maxima comprises a connected component algorithm.

8. A method according to claim 1, comprising displaying the identified maximum with the maximum intensity projection image.

9. An apparatus for identifying a region of interest in medical imaging data of a subject, comprising:
    a processor configured to generate a maximum intensity projection image from the medical imaging data, using projection rays at respective projection angles, process the medical imaging data to find one or more maxima in the medical imaging data by using projection rays at respective projection angles, compare the found one or more maxima with the maximum intensity projection image, and identify one of the maxima which is not represented in the maximum intensity projection image and do not contribute to any projection ray on any of said projection angles of the maximum intensity projection image; and
    a display device in communication with said processor at which said processor is configured to cause the identified maximum with the intensity projection image to be displayed.

10. A non-transitory, computer-readable data storage medium encoded with programming instructions, said storage medium being loadable into a processor of a medical imaging apparatus, and said programming instructions causing said medical imaging apparatus to be operated to:
    generate a maximum intensity projection image from medical imaging data, using projection rays at respective projection angles process the medical imaging data to find one or more maxima in said medical imaging data by identifying maxima from the processed imaging data which do not contribute to any projection ray on any of said projection angles of the maximum intensity projection image;
    compare the found one or more maxima with the maximum intensity projection image, and identify one of the maxima which is not represented in the maximum intensity projection image, and make an indication of said one of said maxima available in electronic form at an output of said processor.

* * * * *